(12) United States Patent
Kihara

(10) Patent No.: US 10,649,573 B2
(45) Date of Patent: May 12, 2020

(54) DISPLAY DEVICE AND PROGRAM

(71) Applicant: Murata Manufacturing Co., Ltd., Nagaokakyo-shi, Kyoto-fu (JP)

(72) Inventor: Takashi Kihara, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 15 days.

(21) Appl. No.: 15/284,952

(22) Filed: Oct. 4, 2016

(65) Prior Publication Data

US 2017/0024069 A1    Jan. 26, 2017

Related U.S. Application Data

(63) Continuation of application No. PCT/JP2015/057812, filed on Mar. 17, 2015.

(30) Foreign Application Priority Data

Apr. 18, 2014  (JP) .................. 2014-086029

(51) Int. Cl.
  *G06F 3/041* (2006.01)
  *G06F 3/0488* (2013.01)
  *G06F 3/0487* (2013.01)
  *G06F 3/044* (2006.01)
  *G02F 1/1333* (2006.01)
  *G02F 1/1335* (2006.01)

(52) U.S. Cl.
  CPC ............ *G06F 3/0416* (2013.01); *G06F 3/044* (2013.01); *G06F 3/0412* (2013.01); *G06F 3/0487* (2013.01); *G06F 3/0488* (2013.01); *G02F 1/13338* (2013.01); *G02F 1/133345* (2013.01); *G02F 1/133528* (2013.01); *G06F 2203/04105* (2013.01)

(58) Field of Classification Search
  CPC .... G06F 3/0488; G06F 3/0412; G06F 3/0416; G06F 3/044; G06F 3/0487; G06F 2203/04105; G02F 1/133345; G02F 1/13338; G02F 1/133528
  See application file for complete search history.

(56) References Cited

U.S. PATENT DOCUMENTS

| 7,508,460 B1 * | 3/2009 | Gerstman ............ H04N 5/4403 348/706 |
| 9,262,002 B2 | 2/2016 | Momeyer et al. |
| 9,274,682 B2 | 3/2016 | Hinckley et al. |

(Continued)

FOREIGN PATENT DOCUMENTS

| JP | 2010/107688 A | 5/2010 |
| JP | 2013/025594 A | 2/2013 |

(Continued)

OTHER PUBLICATIONS

International Search Report issued for PCT/JP2015/057812, dated Apr. 28, 2015.

(Continued)

*Primary Examiner* — Christopher E Leiby
(74) *Attorney, Agent, or Firm* — Arent Fox LLP

(57) ABSTRACT

The pressing operation detector of a display device detects a pressing of a housing via an area other than an area of the display surface. The display device executes a first processing when detecting only the pressing of the housing.

24 Claims, 9 Drawing Sheets

(56) References Cited

U.S. PATENT DOCUMENTS

| | | | | |
|---|---|---|---|---|
| 9,588,552 B2* | 3/2017 | Hsieh | | G06F 1/169 |
| 2009/0219255 A1* | 9/2009 | Woolley | | G06F 3/0416 |
| | | | | 345/173 |
| 2010/0053672 A1* | 3/2010 | Peng | | B41J 29/393 |
| | | | | 358/1.15 |
| 2011/0087963 A1* | 4/2011 | Brisebois | | G06F 3/03547 |
| | | | | 715/702 |
| 2011/0115335 A1* | 5/2011 | Pelletier | | G06F 1/3203 |
| | | | | 310/318 |
| 2011/0205163 A1 | 8/2011 | Hinckley et al. | | |
| 2012/0105358 A1 | 5/2012 | Momeyer et al. | | |
| 2014/0173529 A1* | 6/2014 | Hicks | | G06F 3/04883 |
| | | | | 715/863 |
| 2015/0042590 A1* | 2/2015 | Ando | | G06F 3/0354 |
| | | | | 345/173 |
| 2015/0054733 A1* | 2/2015 | Pedersen | | A63H 5/00 |
| | | | | 345/156 |
| 2015/0054778 A1* | 2/2015 | Zhao | | G06F 3/048 |
| | | | | 345/174 |
| 2015/0135109 A1* | 5/2015 | Zambetti | | G06F 3/0488 |
| | | | | 715/767 |
| 2015/0143493 A1* | 5/2015 | Tsai | | H04L 63/083 |
| | | | | 726/7 |
| 2015/0160770 A1* | 6/2015 | Stewart | | G06F 3/0414 |
| | | | | 345/173 |
| 2015/0168237 A1 | 7/2015 | Tajitsu et al. | | |
| 2016/0195994 A1* | 7/2016 | Kitada | | G06F 3/044 |
| | | | | 345/174 |
| 2016/0239127 A1* | 8/2016 | Kano | | G06F 3/0488 |
| 2017/0038917 A1* | 2/2017 | Reicher | | G06F 3/0482 |
| 2017/0068112 A1* | 3/2017 | Bhatta | | G02C 7/101 |
| 2017/0177106 A1* | 6/2017 | Kihara | | G06F 3/041 |
| 2017/0212577 A1* | 7/2017 | Yamamoto | | G06F 1/3234 |
| 2018/0025142 A1* | 1/2018 | Zafiris | | G06F 21/32 |
| | | | | 726/19 |

FOREIGN PATENT DOCUMENTS

| | | |
|---|---|---|
| JP | 2013520727 A | 8/2013 |
| JP | 2013/541795 A | 11/2013 |
| WO | WO 2013/175848 A1 | 11/2013 |
| WO | WO 2013/175848 A | 1/2016 |

OTHER PUBLICATIONS

Written Opinion of the International Searching Authority Issued for PCT/JP2015/057812, dated Apr. 28, 2015.

* cited by examiner

Y DIRECTION
X DIRECTION

DISPLAY DEVICE AND PROGRAM

CROSS REFERENCE TO RELATED APPLICATIONS

The present application is a continuation of International application No. PCT/JP2015/057812, filed Mar. 17, 2015, which claims priority to Japanese Patent Application No. 2014-086029, filed Apr. 18, 2014, the entire contents of each of which are incorporated herein by reference.

FIELD OF THE INVENTION

The present invention relates to a display device which includes a display, a touch panel which includes a sensor detecting a position of a touch operation and a frame body, a pressing operation detector which detects a pressing and a controller which performs processing corresponding to the detected touch operation and pressing.

BACKGROUND OF THE INVENTION

Conventionally, display devices which each include a display, a touch panel which detects a position of a touch operation from a user, a pressing operation detector which detects a pressing from a user and a controller which performs processing corresponding to the detected touch operation and pressing.

For example, in a mobile information device (display device) disclosed in Patent Literature 1, a touch panel and a display are stacked together. Thus, in the display device disclosed in Patent Literature 1, a controller (control circuit) performs processing of displaying images according to a change in an input position of a touch operation received by a display surface of the display. Further, in the display device disclosed in Patent Literature 1, the controller performs another processing of displaying images when a user presses the display surface at a touch position.

Patent Document 1: Japanese Patent Application Laid-Open No. 2013-25594

SUMMARY OF THE INVENTION

However, the display device disclosed in Patent Literature 1 does not execute processing as long as the display device does not detect a position of a touch operation. That is, only the display surface of the display device disclosed in Patent Literature 1 can receive an input of an operation for causing execution of processing.

It is therefore an object of the present invention to provide a display device which receives an input of operation from a user via an area other than a display surface and performs processing, and a program.

A display device according to the present invention includes a display; a housing which includes an opening through which a display surface of the display is exposed; a position detector which detects a position of a touch operation of the display surface; a pressing operation detector which detects a pressing of the housing; and a controller.

The controller performs a first processing when the position detector does not detect the position of the touch operation and the pressing operation detector detects the pressing of the housing, and performs a second processing when the position detector detects the position of the touch operation of the display surface.

The position detector detects a user's operation of touching the display surface as a touch operation. That is, the touch operation is not limited to actual contact on the display surface but includes a non-contact touch operation. The non-contact touch operation is detected by, for example, providing a capacitive touch panel or an optical sensor to the display.

The pressing operation detector detects a pressing operation with respect to the housing. That is, the display surface is exposed through the opening portion of the housing, so that the pressing operation detector detects a pressing operation via an area other than the display surface.

The display device according to the present invention executes first processing even when detecting only the pressing operation, and, consequently, can receive an input of a pressing operation from a user via an area other than the area of the display surface and execute the first processing.

While the first processing may be the same as the second processing, the first processing may be processing which makes the position of the touch operation unnecessary for the controller.

For example, the second processing is processing associated with an icon displayed at a position of the detected touch operation. The first processing is not processing which is associated with a displayed icon, but is processing such as powering off of the display device, which does not make position information of a touch operation necessary for the controller.

For example, the pressing operation detector may be disposed along an inner surface of the housing to detect a pressing operation with respect to an outer surface at an opposite side of the inner surface, or may be disposed along an inner surface at the side of the display surface.

When the pressing operation detector is disposed along the inner surface at the side of the display surface, a surface of the housing (an outer surface at the opposite side of the inner surface at the side of the display surface) which receives a pressing operation is disposed at the same side as that of the display surface. Consequently, the display device can improve operability for operating a pressing operation and a touch operation in series.

Further, the pressing operation detector may include a piezoelectric film made of a chiral polymer.

The chiral polymer has a main chain which adopts a spiral structure. The chiral polymer produces electric charges when the piezoelectric film is pressed. A piezoelectric property of the chiral polymer derives from a molecular structure, and therefore does not need to be polled compared to polymers of ferroelectrics such as PVDF (polyvinylidene fluoride).

The chiral polymer may be poly-L-lactic acid.

Polylactic acid (PLA) has a high piezoelectric output constant among chiral polymers. Poly-L-lactic acid (PLLA) stretched in a uniaxial direction in particular has a high piezoelectric output constant among polylactic acid. By using a material of a high piezoelectric output constant, the pressing operation detector can accept a pressing operation with a high sensitivity. Further, polylactic acid has very low pyroelectricity unlike PVDF. Hence, the piezoelectric film made of polylactic acid is suitable for a component of the pressing operation detector to which a temperature of a finger is transmitted.

Further, the present invention is not limited to the display device and may be a program. A program according to the present invention is executed by a computer which includes: a display; a housing which includes an opening portion through which a display surface of the display is exposed; a position detector which detects a position at which a touch operation of the display surface has been performed; and a pressing operation detector which detects a pressing operation of to the housing.

Further, the program according to the present invention executes: a first processing when the position detector does not detect the position of the touch operation and the pressing operation detector detects the pressing operation, and a second processing when the position detector detects the position of the touch operation.

According to the present invention, even when detecting only a pressing operation via an area other than an area of a display surface, the display device executes first processing. Consequently, a user can give an input of the pressing operation performed in the area other than the area of the display surface, to the display device and cause the display device to execute the first processing.

DETAILED DESCRIPTION OF THE INVENTION

Figure 1:
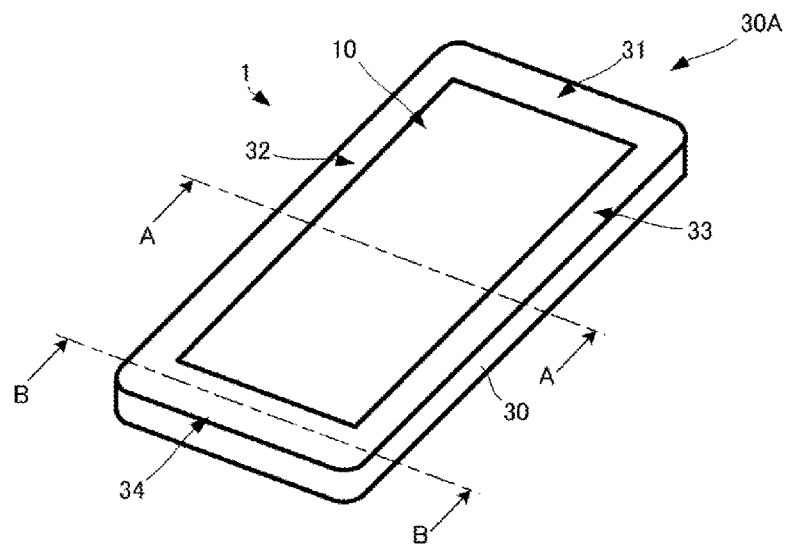
FIG. 1 is an external appearance perspective view of a mobile terminal according to a first embodiment.
Figure 1:
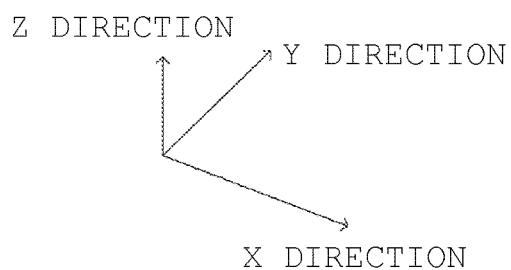
Figure 2:
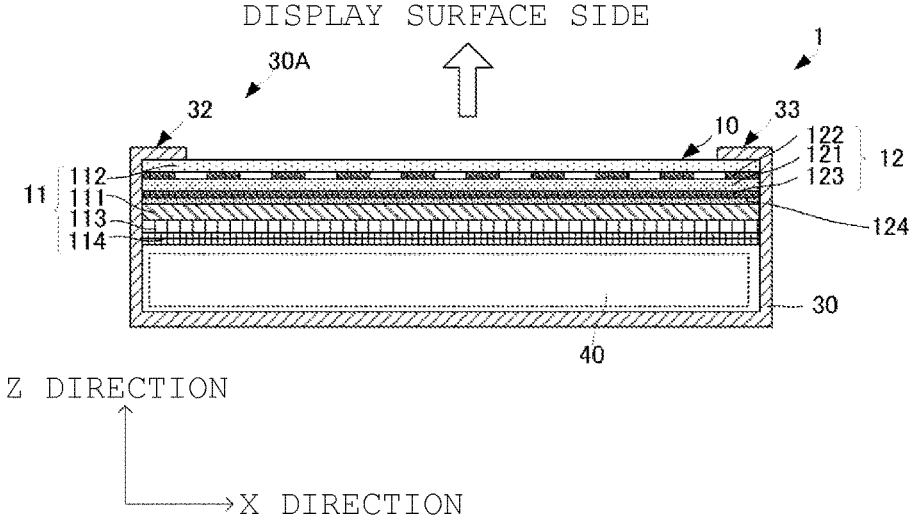
FIG. 2 is a sectional view of the mobile terminal taken along line A-A.
Figure 3:
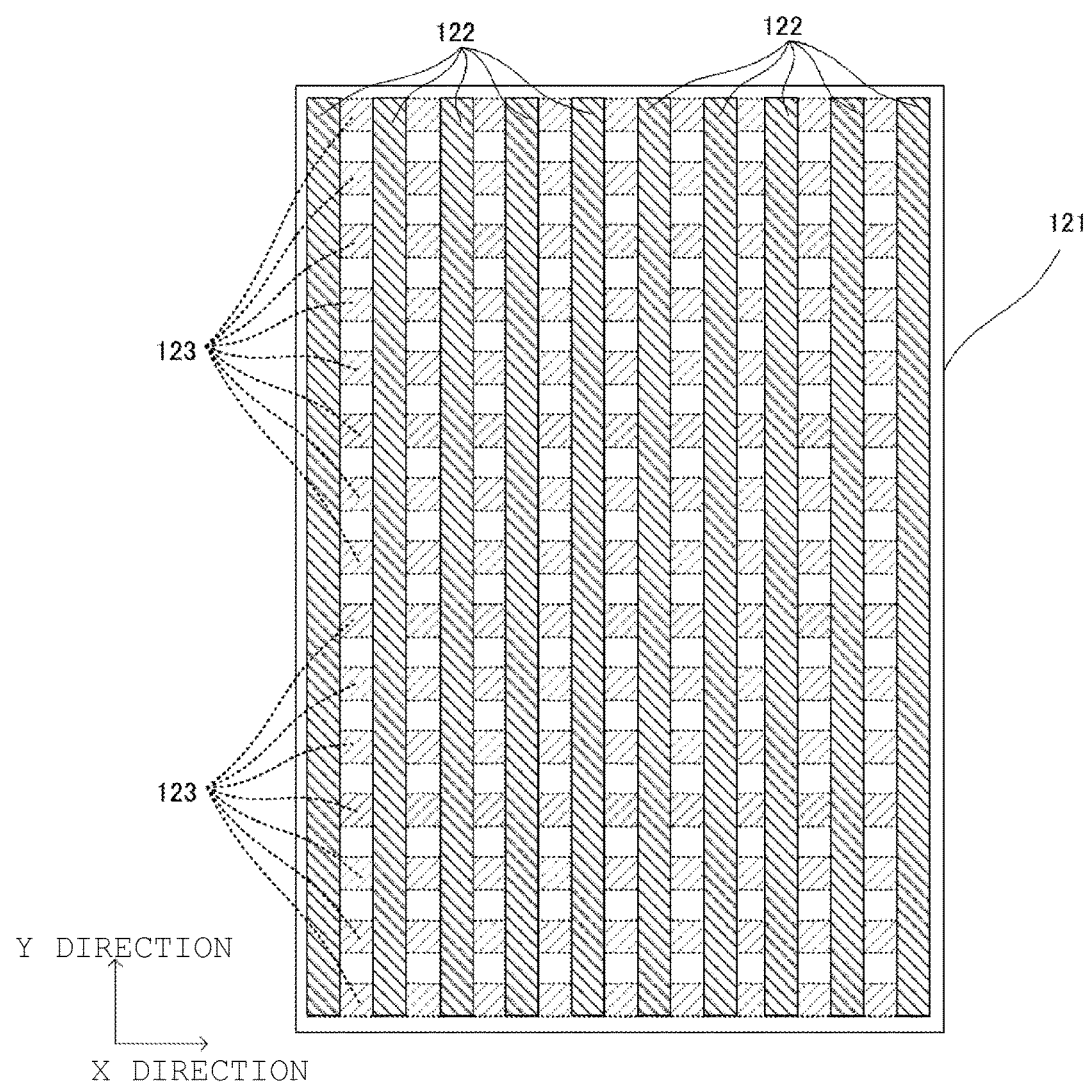
FIG. 3 is a plan view of an electrostatic sensor.
Figure 4:
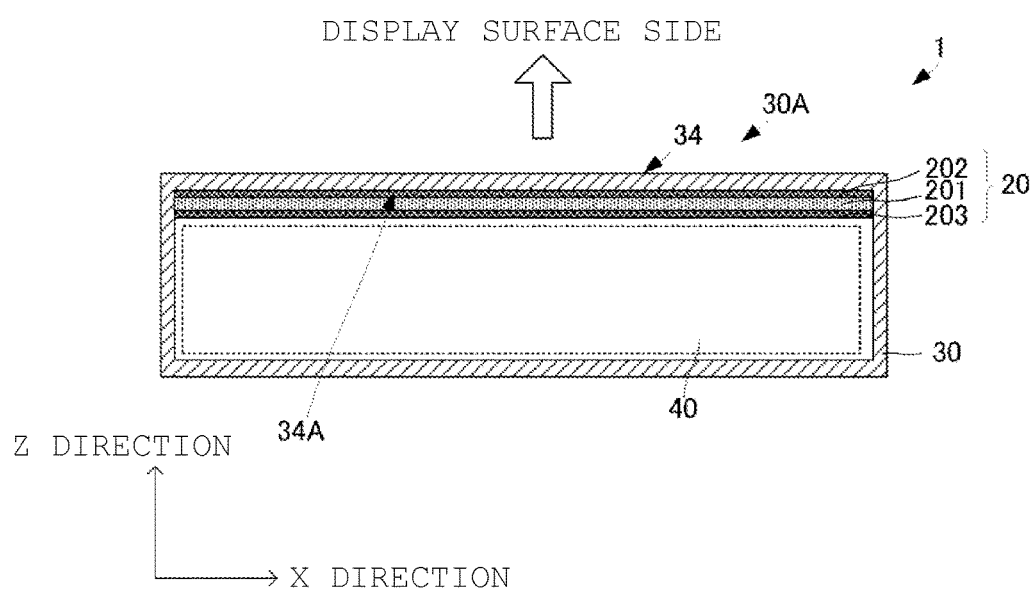
FIG. 4 is a sectional view of the mobile terminal taken along line B-B.
Figure 5:
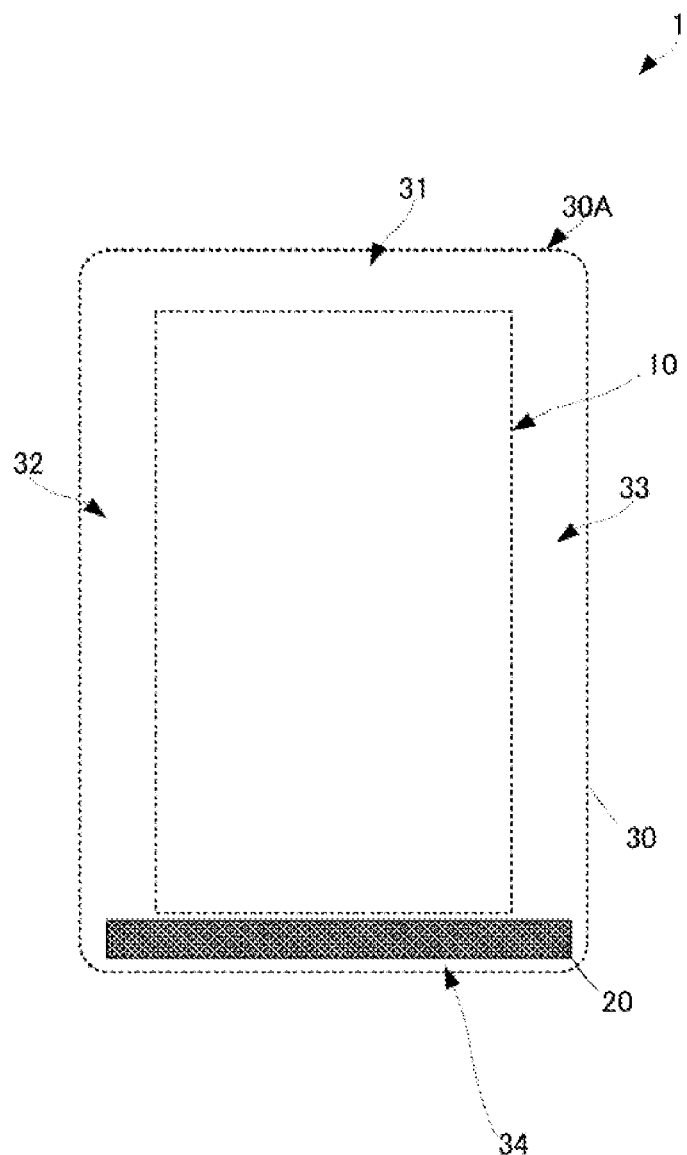
FIG. 5 is a plan view of a piezoelectric sensor.
Figure 6:
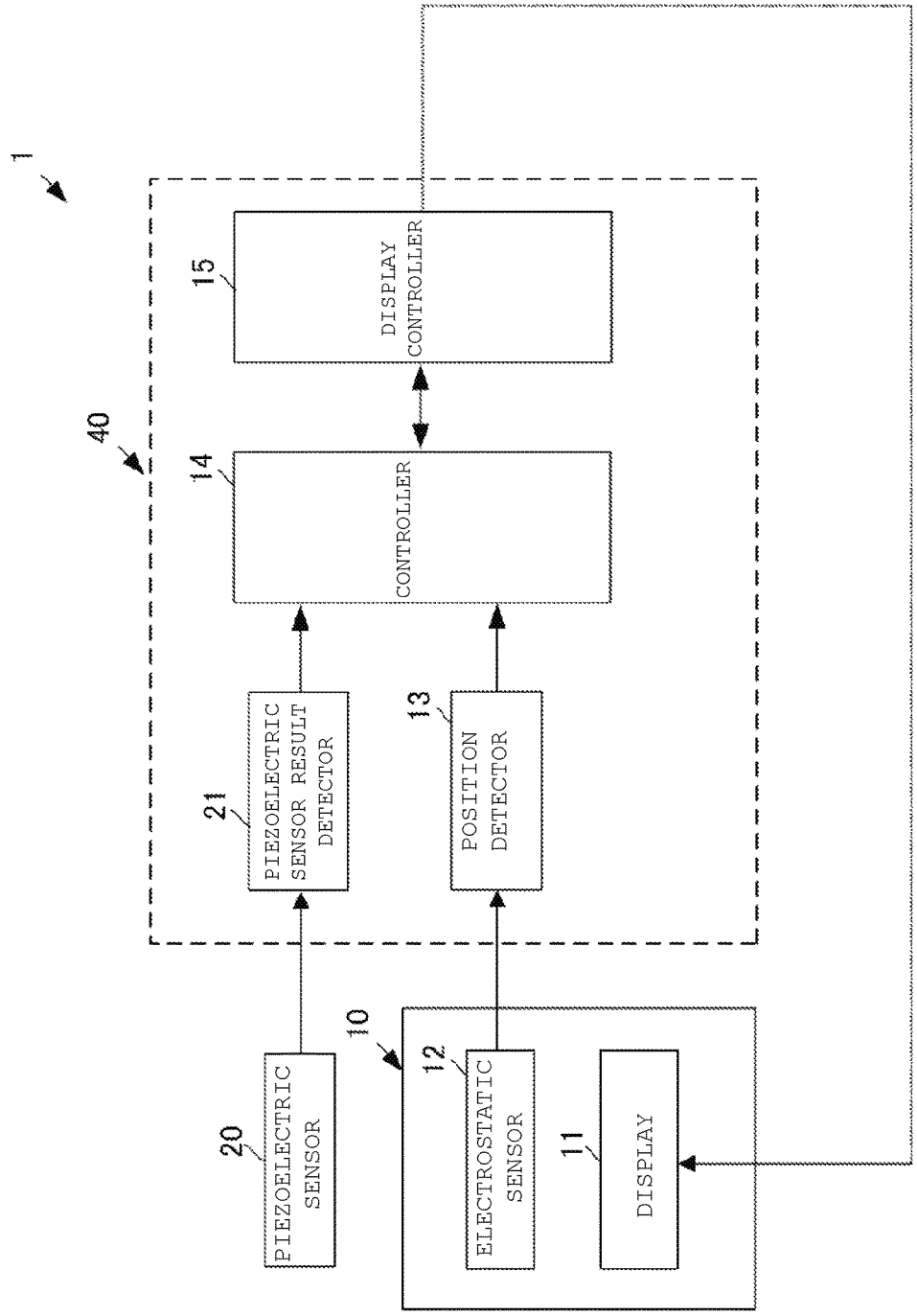
FIG. 6 is a block diagram illustrating part of a configuration of the mobile terminal.

A mobile terminal 1 according to a first embodiment of the present invention will be described with reference to FIGS. 1 to 6. FIG. 1 is an external appearance perspective view of the mobile terminal 1. FIG. 2 is a sectional view of the mobile terminal 1 taken along line A-A. FIG. 3 is a plan view of an electrostatic sensor 12. FIG. 4 is a sectional view of the mobile terminal 1 taken along line B-B. FIG. 5 is a plan view of a piezoelectric sensor 20. FIG. 6 is a block diagram illustrating part of a configuration of the mobile terminal 1. In addition, in FIG. 5, components of the mobile terminal 1 other than the piezoelectric sensor 20 are indicated by dotted lines to explain the piezoelectric sensor 20.

As illustrated in FIG. 1, the mobile terminal 1 includes a housing 30 of a substantially cuboid shape. An opening is formed in a surface of the housing 30. In addition, it is assumed below that an X direction illustrated in FIG. 1 is a width direction of the housing 30, a Y direction is a length direction and a Z direction is a thickness direction. Further, in the present embodiment, the width of the housing 30 is shorter than the length of the housing 30. However, the housing 30 may have the width and the length of the same lengths or may have the longer width than the length.

As illustrated in FIGS. 2 and 4, a display input unit 10, the piezoelectric sensor 20 and an arithmetic logic unit 40 are disposed inside the housing 30.

The display input unit 10 is exposed to an outside through the opening portion of the housing 30. Thus, a Z side surface of the display input unit 10 serves as a display surface. A bezel portion 30A of the housing 30 is adjacent to an outer circumference of the display surface to hold the display input unit 10. More specifically, the bezel portion 30A is formed by an upper portion 31 and a lower portion 34 lying along the width direction, and a lateral portion 32 and a lateral portion 33 lying along a length direction.

As illustrated in FIG. 2, the arithmetic logic unit 40 and the display input unit 10 are disposed in order in the thickness direction. The display input unit 10 includes a display 11, the electrostatic sensor 12 and an insulation film 124. The display 11 and the electrostatic sensor 12 have substantially same shapes seen from a display surface side of the housing 30.

As illustrated in FIG. 2, the display 11 includes a liquid crystal panel 111, a top surface polarizing plate 112, a back surface polarizing plate 113 and a backlight 114.

The backlight 114, the back surface polarizing plate 113, the liquid crystal panel 111, the insulation film 124, the electrostatic sensor 12 and the top surface polarizing plate 112 are disposed in order in the thickness direction.

As illustrated in FIGS. 2 and 3, the electrostatic sensor 12 includes a base film 121, a plurality of capacitance detection electrodes 122 and a plurality of capacitance detection electrodes 123.

The base film 121 is made of a material having translucency and a predetermined dielectric constant. The plurality of capacitance detection electrodes 122 and the plurality of capacitance detection electrodes 123 each have an elongated shape and are made of a conductive material having translucency. The plurality of capacitance detection electrodes 122 is aligned and formed at predetermined intervals on a first principal surface (+Z side surface) of the base film 121. The plurality of capacitance detection electrodes 123 is aligned and formed at predetermined intervals on a second principal surface (−Z side surface) of the base film 121. The alignment direction of the plurality of capacitance detection electrodes 122 and the alignment direction of the plurality of capacitance detection electrodes 123 are set substantially orthogonal when seen from a normal direction of the first principal surface or the second principal surface of the base film 121.

When a finger approaches the electrostatic sensor 12, a capacitance changes. Hence, a position detector 13 (see FIG. 6) detects each touch position by specifying a pair of the capacitance detection electrode 122 and the capacitance detection electrode 123 whose capacitance has changed. In this regard, it is possible to detect changes of capacitances even when a finger does not actually touch the top surface polarizing plate 112. Further, it is also possible to detect touch positions by using an optical sensor which detects approaches of a finger to the top surface polarizing plate 112 instead of using the electrostatic sensor 12.

When detecting touch positions, the position detector 13 outputs information of the touch positions to a controller 14.

The piezoelectric sensor 20 has a flat film shape. As illustrated in FIG. 4, the piezoelectric sensor 20 is disposed adjacent to and along an inner surface 34A (−Z side surface) of the lower portion 34 of the bezel portion 30A. More specifically, as illustrated in FIG. 5, the piezoelectric sensor 20 is disposed adjacent to and along the inner surface 34A of the lower portion 34 such that a longitudinal direction lies along the width direction of the mobile terminal 1. The arithmetic logic unit 40 and the piezoelectric sensor 20 are disposed in order in the thickness direction as illustrated in FIG. 4. In this regard, the piezoelectric sensor 20 does not need to lie along the entire inner surface 34A of the lower portion 34, and only needs to lie along part of the inner surface 34A.

As illustrated in FIG. 4, the piezoelectric sensor 20 includes a piezoelectric film 201, a piezoelectric detection electrode 202 and a piezoelectric detection electrode 203.

The piezoelectric film 201, the piezoelectric detection electrode 202 and the piezoelectric detection electrode 203 each have a flat film shape. The piezoelectric detection electrode 202 is formed on the first principal surface (+Z side surface) of the piezoelectric film 201. The piezoelectric detection electrode 203 is formed on the second principal surface (−Z side surface) of the piezoelectric film 201.

The piezoelectric film 201 is made of, for example, uniaxially stretched polylactic acid. Further, the piezoelectric film 201 produces electric charges in the first principal surface and the second principal surface when pressed in the Z direction or the −Z direction. When electric charges are produced in the first principal surface and the second principal surface of the piezoelectric film 201, a potential difference between the piezoelectric detection electrode 202 and the piezoelectric detection electrode 203 is produced. The piezoelectric film 201 is disposed adjacent to and along the inner surface 34A of the lower portion 34, and therefore is pushed in the −Z direction when, for example, the user presses the lower portion 34 of the bezel portion 30A. Then, a potential difference is produced between the piezoelectric detection electrode 202 and the piezoelectric detection electrode 203.

Further, this potential difference level (e.g. mV) corresponds to a press amount (or a push amount which is, for example, several tens of μm) of the piezoelectric film 201. Consequently, by calculating the potential difference level (mV) between the piezoelectric detection electrode 202 and the piezoelectric detection electrode 203, it is possible to detect whether or not a pressing operation with respect to the piezoelectric sensor 20 has been performed, and to calculate a press amount (μm).

The piezoelectric sensor 20 outputs, as a sensor signal, a potential difference between the piezoelectric detection electrode 202 and the piezoelectric detection electrode 203. The sensor signal output from the piezoelectric sensor 20 is input to a piezoelectric sensor result detector 21 as illustrated in FIG. 6. The piezoelectric sensor result detector 21 detects a level LSS (mV) of the input sensor signal. The piezoelectric sensor result detector 21 determines whether or not the pressing operation with respect to the piezoelectric sensor 20 has been performed according to the detected level LSS. When, for example, the level LSS is less than 20 mV, the piezoelectric sensor result detector 21 determines that the pressing operation has not been performed with respect to the piezoelectric sensor 20. When the level LSS is 20 mV or more, the piezoelectric sensor result detector 21 determines that the pressing operation has been performed with respect to the piezoelectric sensor 20. The piezoelectric sensor result detector 21 determines, based on a threshold, whether or not the pressing operation has been performed. Consequently, fine deformation of the housing 30 which is not intended by the user is hardly recognized erroneously as a pressing operation. The piezoelectric sensor result detector 21 outputs to the controller 14 information regarding whether or not the pressing operation has been performed. The piezoelectric sensor result detector 21 may output information of the level LSS (mV) to the controller 14.

Back to explanation of the display 11, light output from the backlight 114 passes through the back surface polarizing plate 113, the liquid crystal panel 111, the insulation film 124, the electrostatic sensor 12 and the top surface polarizing plate 112 in order. The liquid crystal panel 111 allows arriving light to transmit as it is or by changing (polarizing) a vibration direction under control of a display controller 15. Thus, display contents of the display 11 are changed by controlling the backlight 114 and the liquid crystal panel 111.

As described above, the controller 14 receives an input of information of touch positions with respect to the display input unit 10, and information regarding whether or not a pressing operation with respect to the piezoelectric sensor 20 has been performed. The controller 14 performs various types of processing based on these pieces of input information. Information of display related processing is output from the controller 14 to the display controller 15. The display controller 15 controls the display input unit 10 (display 11) to provide display contents corresponding to the information of the display related processing output from the controller 14. That is, the mobile terminal 1 realizes a so-called GUI (Graphical User Interface).

More specifically, this mobile terminal 1 can realize the following processing.

Figure 7:
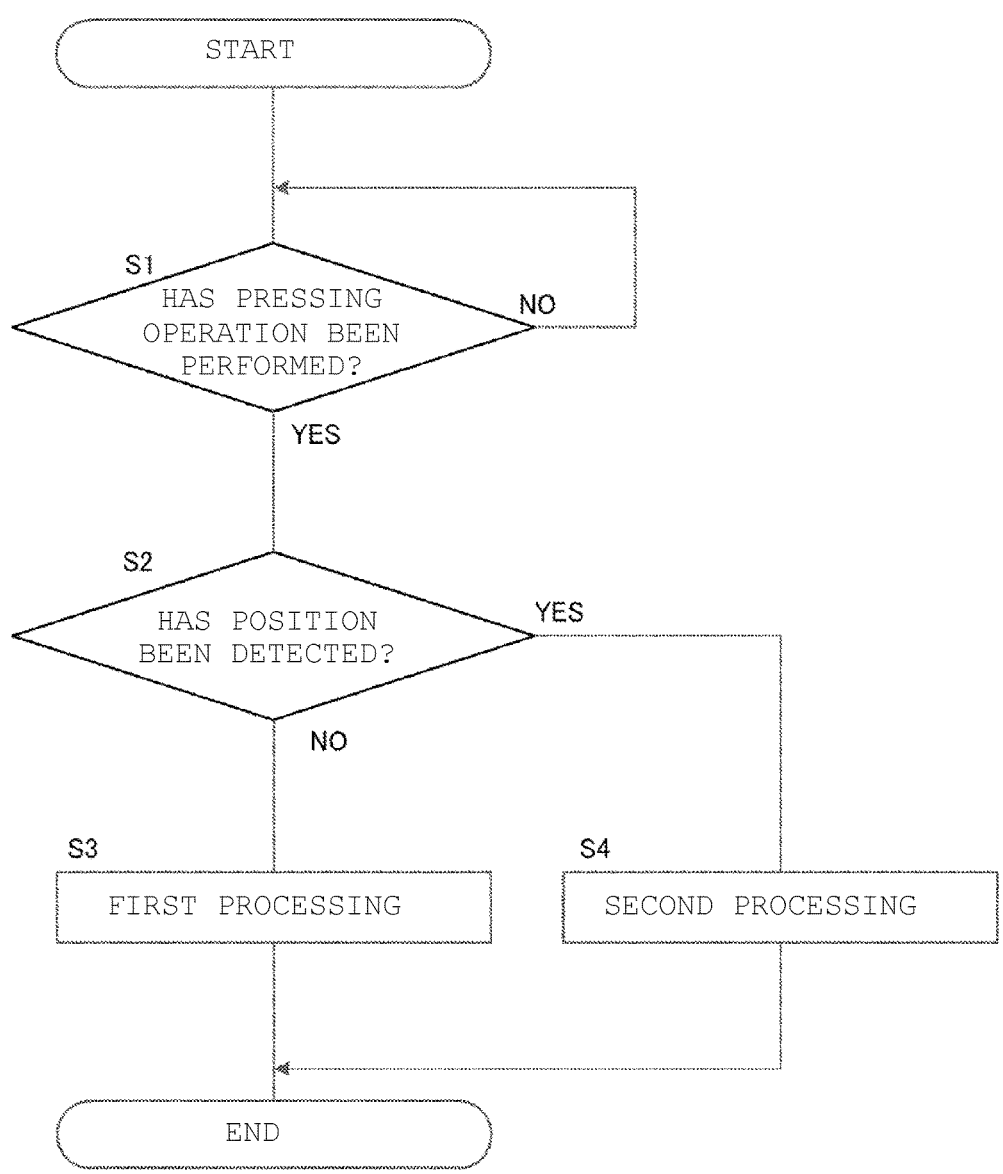
FIG. 7 is a flowchart illustrating an operation of a controller.

FIG. 7 is a flowchart illustrating an operation of the controller 14 of the mobile terminal 1.

First, the controller 14 sends an inquiry to the piezoelectric sensor result detector 21 to determine whether or not the pressing operation with respect to the piezoelectric sensor 20 has been performed (S1). When determining that the pressing operation with respect to the piezoelectric sensor 20 has not been performed (S1: NO), the controller 14 stands by until the pressing operation with respect to the piezoelectric sensor 20 is performed.

When determining that the pressing operation with respect to the piezoelectric sensor 20 has been performed (S1: YES), the controller 14 sends an inquiry to the position detector 13 to determine whether or not a touch position has been detected (S2). When determining that the touch position has not been detected (S2: NO), the controller 14 proceeds to step S3 and executes first processing. When determining that the touch position has been detected (S2: YES), the controller 14 proceeds to step S4 and executes second processing.

That is, the first processing is executed when the pressing operation with respect to the piezoelectric sensor 20 is performed and a touch operation with respect to the display input unit 10 is not performed. The second processing is executed when the pressing operation with respect to the piezoelectric sensor 20 is performed and the touch operation with respect to the display input unit 10 is performed.

The second processing includes processing which makes information of a touch position necessary for the controller 14. When, for example, the user touches a display area of an icon displayed on the display input unit 10, the controller 14 executes an application program (e.g. mail transmitting and receiving program) associated with the icon. That is, the controller 14 executes (processes) the application program associated with the touch position belonging to the display area of the icon. The controller 14 may perform execution (processing) of such an application program as the second processing.

By contrast with this, the first processing is processing such as powering off of the mobile terminal 1 and initial screen display of the mobile terminal 1, and makes information of a touch position unnecessary for the controller 14. In this regard, that the first processing makes the information of the touch position unnecessary is not an essential configuration according to the present invention. That is, the first processing may be to execute the mail transmitting and receiving program, for example.

Figure 8:
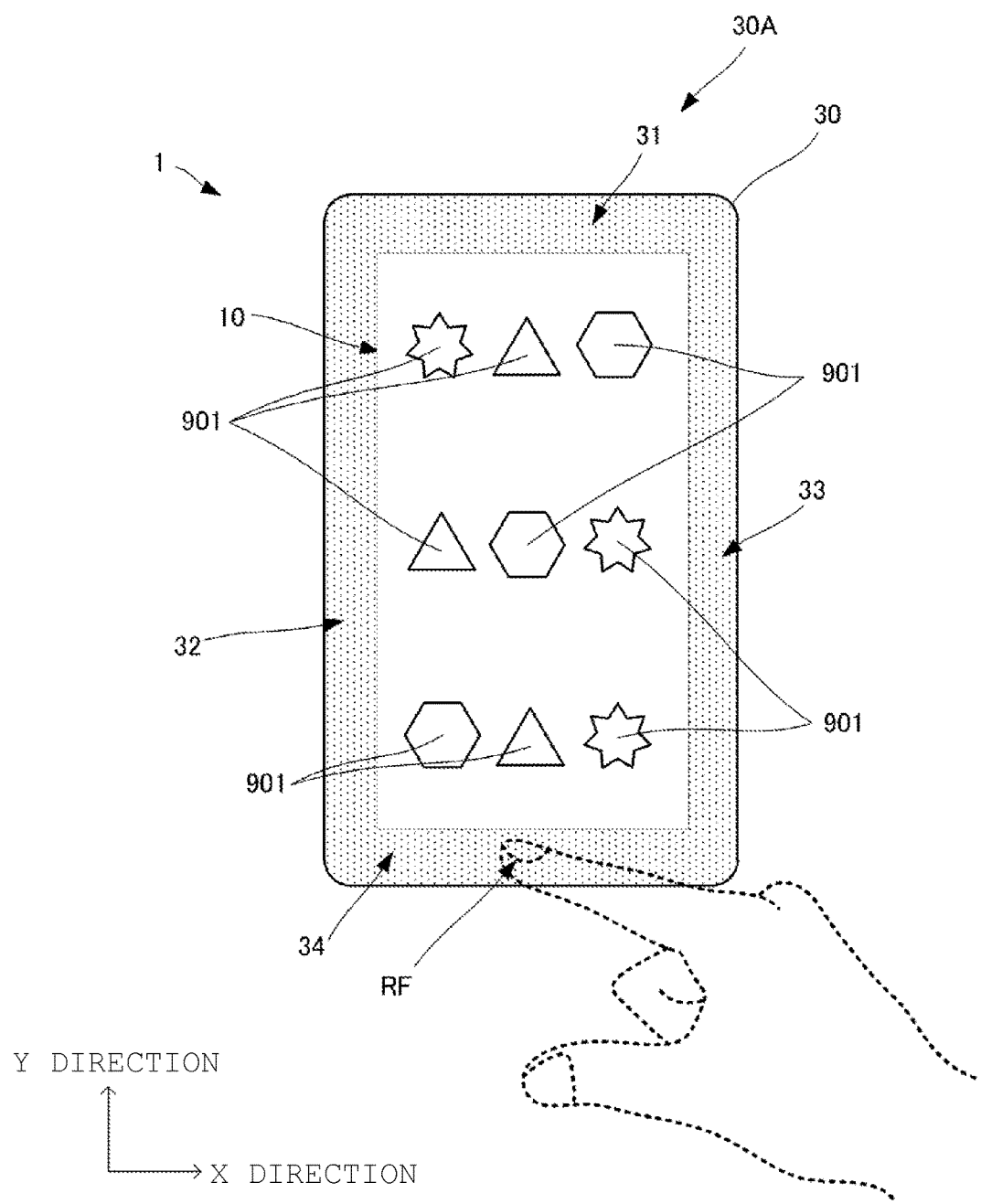
FIG. 8 is a plan view of the mobile terminal for explaining a pressing operation with respect to a lower portion of a bezel portion of the mobile terminal.

An example of the first processing will be described with reference to FIG. 8. FIG. 8 is a plan view of the mobile terminal 1 for explaining a pressing operation with respect to the lower portion 34 of the bezel portion 30A of the mobile terminal 1.

As illustrated in FIG. 8, the user presses the lower portion 34 of the bezel portion 30A by a right forefinger RF without touching a display area of a plurality of icons 901. Then, the mobile terminal 1 determines that the pressing operation has been performed (S1: YES) and the touch position has not been detected (S2: NO), and executes the first processing (S3). Thus, the user can give a pressing operation performed in an area other than the area of the display surface of the display input unit 10, to the mobile terminal 1 and cause the mobile terminal 1 to execute the first processing.

Further, the mobile terminal 1 is formed by disposing a surface (an outer surface of the lower portion 34) which receives a pressing operation, and the display surface which receives an input of a touch operation adjacent in the same Z direction. Consequently, the mobile terminal 1 can improve operability for operating a pressing operation and a touch operation in series.

In addition, the controller 14 may obtain the level LSS (mV) from the piezoelectric sensor result detector 21 before executing step S3 illustrated in a flowchart in FIG. 7, and execute the first processing corresponding to the obtained level LSS. For example, the controller 14 executes initial screen display processing when the obtained level LSS is 20 mV or more and is less than 50 mV, and executes the mail transmitting and receiving program when the obtained level LSS is 50 mV or more.

Further, the controller 14 may calculate a pressing time during which the pressing operation has continued before executing step S3 illustrated in the flowchart in FIG. 7, and execute the first processing according to the calculated pressing time. For example, the controller 14 executes the initial screen display processing when the pressing time is 0.5 seconds or more and is less than one second, and executes powering off of the mobile terminal 1 when the pressing time is one second or more.

Further, the controller 14 may execute the first processing (e.g. unlocking of security lock of the mobile terminal 1) according to the number of times of pressing operations performed during a predetermined time (e.g. two seconds). Naturally, the controller 14 may determine the first processing which needs to be executed under conditions of a combination of the above level LSS, the pressing time and the number of times of pressing operations.

Hereinafter, the piezoelectric film 201 will be described. The piezoelectric film 201 is a film made of chiral polymers. As the chiral polymers, polylactic acid (PLA) and, more particularly, poly-L-lactic acid (PLLA) is used in the present embodiment. The PLLA is uniaxially stretched.

The PLLA belongs to a group of very high piezoelectric output constants among polymers, and therefore is suitable for the piezoelectric sensor 20.

Further, the PLLA does not have pyroelectricity unlike other ferroelectric piezoelectric bodies (e.g. PVDF). Hence, the PLLA is suitable for a component such as the piezoelectric sensor 20 to which a temperature of the finger is transmitted by a pressing operation.

In this regard, using the PLLA for the piezoelectric film 201 is not essential in the present embodiment. For the piezoelectric sensor 20, the piezoelectric film 201 made of, for example, the PVDF may be used.

When the piezoelectric film 201 is made of PLLA having a high piezoelectric output constant, and even when the upper portion 31, the lateral portion 32 and the lateral portion 33 of the bezel portion 30A are pressed, the piezoelectric sensor 20 detects a slight displacement in the Z direction caused by a deformation transmitted to the lower portion 34. That is, when the piezoelectric film 201 is made of PLLA, the mobile terminal 1 can receive an input of a pressing operation via any position of the bezel portion 30A, and execute the first processing. Hence, the piezoelectric sensor 20 may be disposed not only on the inner surface 34A of the lower portion 34 but also at any position on the inner surface of the bezel portion 30A. Further, when the piezoelectric film 201 is made of PLLA of a high piezoelectric output constant, the piezoelectric sensor 20 can detect a pressing operation with respect to the display input unit 10, too.

Figure 9:
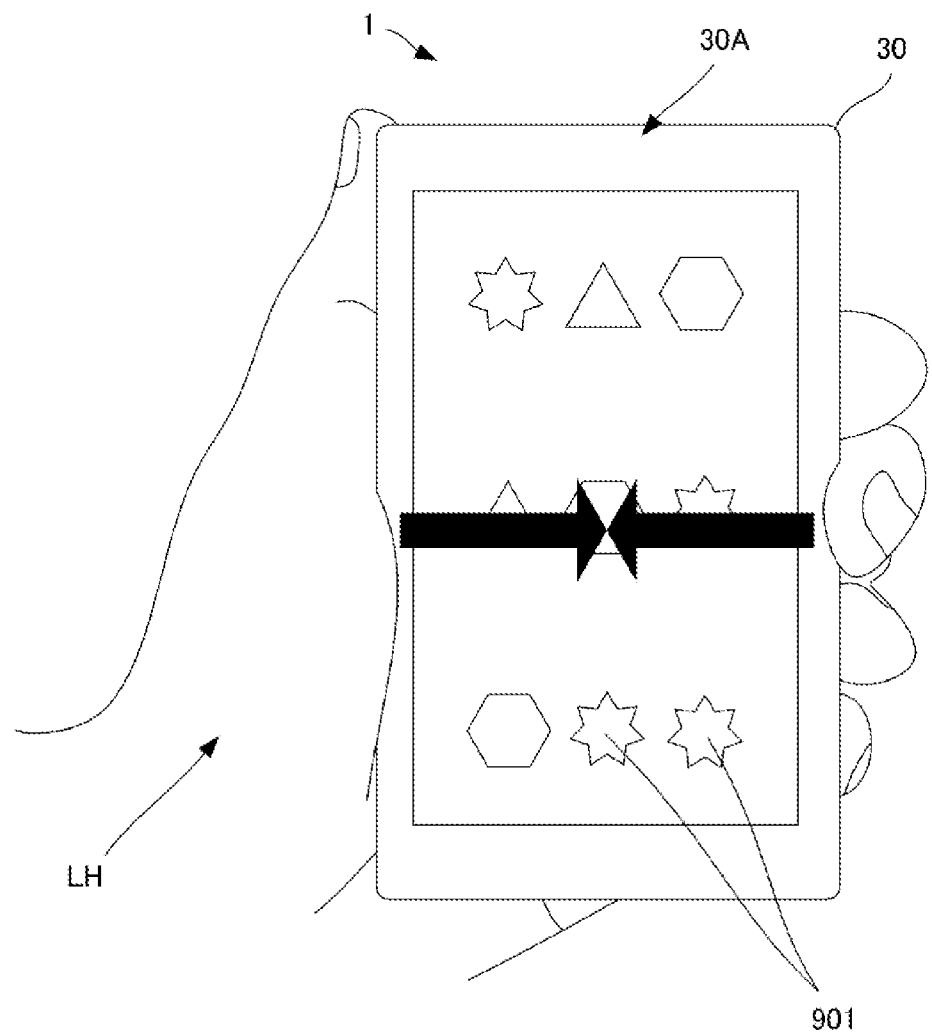
FIG. 9 is a plan view of the mobile terminal for explaining a pressing operation with respect to a side surface of the mobile terminal.

Next, FIG. 9 is a plan view of the mobile terminal 1 for explaining a pressing operation with respect to a side surface of the mobile terminal 1.

When the piezoelectric film 201 is made of PLLA of a high piezoelectric output constant, the piezoelectric sensor 20 detects a slight displacement of the bezel portion 30A in the Z direction or the −Z direction, too, and, consequently, can detect a pressing operation even when the user does not press a principal surface of the piezoelectric film 201. As illustrated in, for example, FIG. 9, when the user grips both side surfaces of the mobile terminal 1 and presses the both side surfaces in a direction indicated by a black arrow in FIG. 9, not only the both side surfaces but also the surface at the bezel portion 30A and a back surface (the surface in the −Z direction) of the housing 30 deform. Then, the piezoelectric sensor 20 of the mobile terminal 1 disposed adjacent to and along the inner surface 34A of the lower portion 34 detects a pressing operation. Thus, the user can give an input of the pressing operation to the mobile terminal 1 only by the left hand gripping the mobile terminal 1 without, for example, using the right hand which performs a touch operation.

As described above, when the piezoelectric film 201 is made of PLLA of a high piezoelectric output constant, the piezoelectric sensor 20 can be disposed regardless of a place to be pressed. That is, the pressing sensor 20 is the most preferably disposed right below a place to be pressed, yet does not necessarily need to be disposed right below the place to be pressed. The pressing sensor 20 only needs to be disposed at a position to which a deformation produced by a press transmits and at which the pressing sensor 20 is displaced by the transmitted deformation. Hence, using PLLA for the piezoelectric film 201 increases the degree of freedom related to design to dispose the pressing sensor 20, so that it is easy to miniaturize the mobile terminal 1 by effectively using a mounting space. For example, the piezoelectric sensor 20 only needs to detect a pressing operation with respect to the housing 30, and, consequently, may be disposed adjacent to and along the inner surface of the bezel portion 30A or may be disposed as follows.

Figure 10:
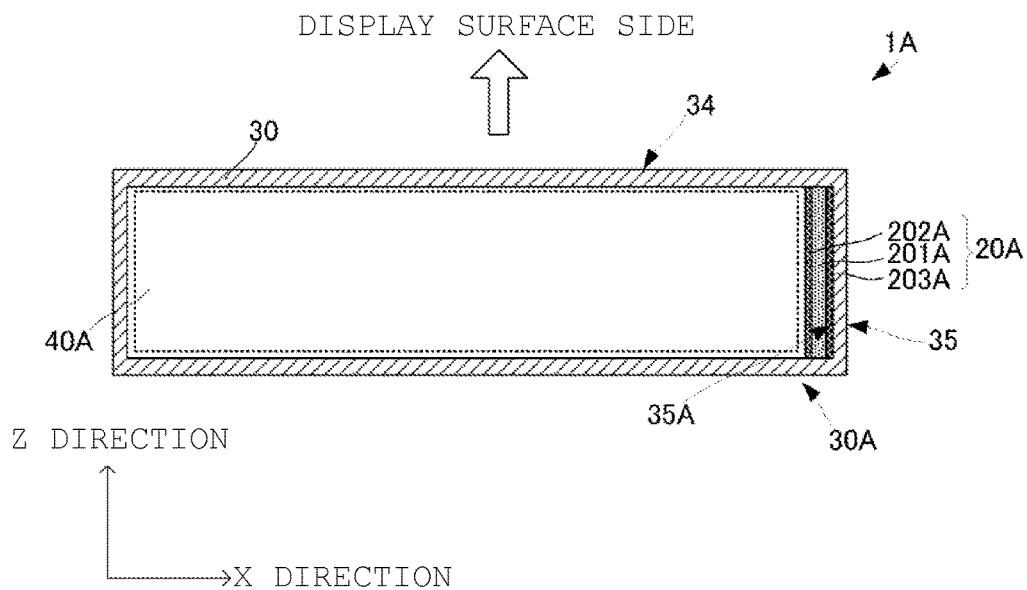
FIG. 10 is a sectional view of a mobile terminal according to a modified example 1.

FIG. 10 is a sectional view of a mobile terminal 1A according to modified example 1 of a mobile terminal 1. The mobile terminal 1A differs from the mobile terminal 1 in that a piezoelectric sensor 20A is disposed adjacent to and along an inner surface 35A of a side surface 35 (a surface in an X direction or a −X direction) of a housing 30. That is, a normal direction of a principal surface of the piezoelectric sensor 20A is the X direction, and a longitudinal direction is a Y direction. Even when the piezoelectric sensor 20A is disposed in this way, the piezoelectric sensor 20A can detect a pressing operation with respect to an area other than an area of a display surface.

Figure 11:
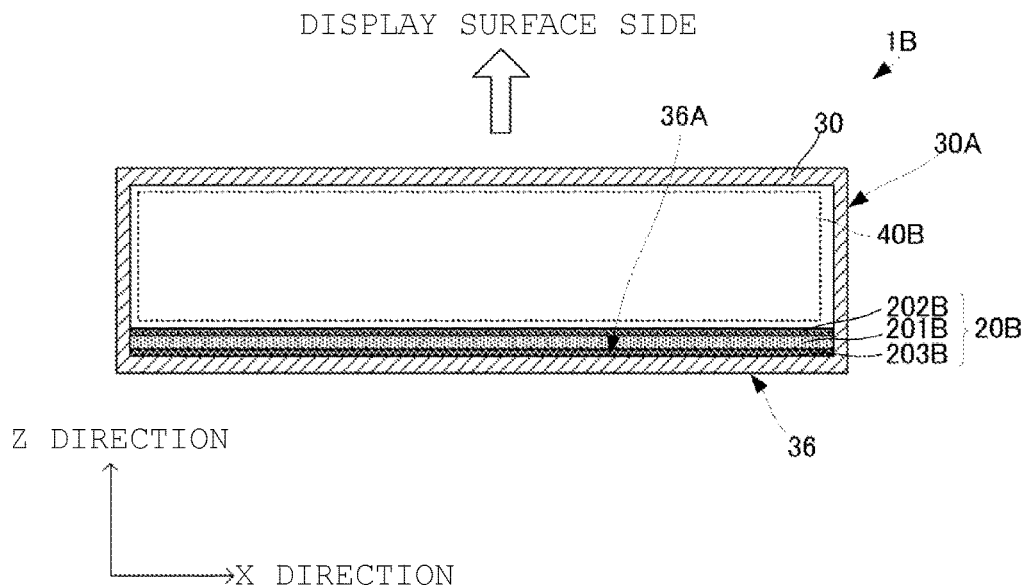
FIG. 11 is a sectional view of a mobile terminal according to a modified example 2.

Next, FIG. 11 is a sectional view of a mobile terminal 1B according to modified example 2 of a mobile terminal 1. The mobile terminal 1B differs from the mobile terminal 1 in that a piezoelectric sensor 20B is disposed adjacent to and along an inner surface 36A of a back surface 36 (a surface in a −Z direction) of the housing 30. That is, placement positions of an arithmetic logic unit 40 and a piezoelectric sensor 20 of the mobile terminal 1 are reversed in the mobile terminal 1B. Even when the piezoelectric sensor 20B is disposed in this way, the piezoelectric sensor 20B can detect a pressing operation with respect to an area other than an area of a display surface.

In the above example, the arithmetic logic unit 40 (a controller 14, a display controller 15, a position detector 13 and a piezoelectric sensor result detector 21) is realized by hardware. However, functions of the arithmetic logic unit 40 may be realized by software. That is, by programming each processing of the arithmetic logic unit 40 and storing this program in a storage medium, and causing an arithmetic unit (e.g. CPU) to read and execute this program, it is possible to realize the above processing.

DESCRIPTION OF REFERENCE SYMBOLS 1, 1A, 1B: MOBILE TERMINAL
10: DISPLAY INPUT UNIT
11: DISPLAY
12: ELECTROSTATIC SENSOR
13: POSITION DETECTOR
14: CONTROLLER
15: DISPLAY CONTROLLER
20, 20A, 20B: PIEZOELECTRIC SENSOR
21: PIEZOELECTRIC SENSOR RESULT DETECTOR
30: HOUSING
30A: BEZEL PORTION
31: UPPER PORTION
32, 33: LATERAL PORTION
34: LOWER PORTION
34A: INNER SURFACE
40: ARITHMETIC LOGIC UNIT
111: LIQUID CRYSTAL PANEL
112: TOP SURFACE POLARIZING PLATE
113: BACK SURFACE POLARIZING PLATE
114: BACKLIGHT
121: BASE FILM
122,123: CAPACITANCE DETECTION ELECTRODE
124: INSULATION FILM
201: PIEZOELECTRIC FILM
202, 203: PIEZOELECTRIC DETECTION ELECTRODE
901: ICON

The invention claimed is:

1. A non-transitory computer readable media having stored thereon a computer program which, when run on one or more processors associated with a display device having display which has a display surface, a housing which includes an opening portion though which the display surface is exposed, a position detector which detects a touch operation applied to the display surface and a pressing operation detector which detects a pressing operation applied to the housing, the pressing operation being a grip force simultaneously applied to opposite sides of the housing that is greater than a threshold value, will cause the one or more processors to:

carry out a first selected operation of a plurality of possible operations when the pressing operation detector detects that the pressing operation is being applied to the housing and the position detector detects that the touch operation is not being applied to the display surface, the one or more processors (a) selecting one of the plurality of possible operations as the first selected operation when the length of time that the pressing operation applied to the housing is greater than a first value and less than a second value and (b) selecting a different one of the plurality of possible operations as the first selected operation when the length of time that the pressing operation is applied to the housing is greater than the second value; and carry out a second selected operation when the pressing operation detector detects that the pressing operation is applied to the housing and the position detector detects that the touch operation is applied to the display surface.

2. The non-transitory computer readable media according to claim 1, wherein the controller selects the first selected operation from the plurality of possible operations as a function of both the amount, greater than zero, that the pressing force is above the threshold value and the length of time that the pressing force is applied to the housing.

3. The non-transitory computer readable media of claim 1, wherein the one of the plurality of possible operations is executing an initial screen display processing and the another of the plurality of possible operations is a mail transmitting and receiving program.

4. The non-transitory computer readable media according to claim 1, wherein the first selected operation is selected from the plurality of possible operations as a function of both the amount, greater than zero, that the pressing force is above the threshold value and the length of time the pressing operation is applied to the housing.

5. The non-transitory computer readable media according to claim 1, wherein the first value is between 0.5 seconds or more and the second value is one second or more.

6. A display device comprising:
a display having a display surface;
a housing which includes an opening portion through which the display surface is exposed;
a position detector which detects a touch operation applied to the display surface;
a pressing operation detector which detects a pressing operation applied to the housing, the pressing operation being a grip force simultaneously applied to opposite sides of the housing that is greater than a threshold value; and
a controller which:
carries out a first selected operation of a plurality of different possible operations when the pressing operation detector detects that the pressing operation is being applied to the housing and the position detector detects that the touch operation is not being applied to the display surface, the controller (a) selecting one of the plurality of possible operations as the first selected operation when the length of time that the pressing operation applied to the housing is greater than a first value and less than a second value and (b) selecting a different one of the plurality of when the length of time that the pressing operation is applied to the housing is greater than the second value; and carries out a second selected operation when the pressing operation detector detects that the pressing operation is being applied to the housing and the position detector detects that the touch operation is being applied to the display surface.

7. The display device according to claim 6, wherein the housing includes a bottom wall located below the bottom surface of the display and at least one side wall located laterally of the display and the pressing operation detector is disposed along an inner surface of the side wall.

8. The display device according to claim 6, wherein the pressing operation detector includes a piezoelectric film made of a chiral polymer.

9. The display device according to claim 8, wherein the chiral polymer is a uniaxially stretched polylactic acid.

10. The display device according to claim 6, wherein the housing includes a bezel that surrounds the display, and the pressing operation detector is disposed within the housing and adjacent the bezel.

11. The display device according to claim 6, wherein the one of the plurality of possible different operations is executing an initial screen display processing and the another of the plurality of possible different operations is a mail transmitting and receiving program.

12. The display device according to claim 6, wherein the controller selects the first selected operation from the plurality of possible operations both as a function of the amount, greater than zero, that the pressing force is above the threshold value and the length of time the pressing operation is applied to the housing.

13. The display device according to claim 6, wherein the housing includes a bottom wall located below a back surface of the display and the pressing operation detector is disposed along an inner surface of the bottom wall.

14. The display device according to claim 6, wherein the first value is between 0.5 seconds and one second and the second value is one second or more.

15. A display device comprising:
a display having a display surface;
a housing which includes an opening through which the display surface is exposed;
a position detector which detects a touch operation applied to the display surface;
a pressing operation detector which detects a pressing operation applied to the housing, the pressing operation being a pressing force applied to the housing that is greater than a threshold value; and
a controller which:
carries out a first selected operation of a plurality of different possible operations when the pressing operation detector detects that the pressing operation is being applied to the housing and the position detector detects that the touch operation is not being applied to the display surface, the controller selecting one of the plurality of possible different operations when n consecutive pressing operations are applied to the same location on the housing, n being an integer greater than 1, and selecting a different one of the plurality of possible different operations when m consecutive pressing operations, m being an integer greater than n, are applied to the same location on the housing; and
carries out a second selected operation when the pressing operation detector detects that the pressing operation is being applied to the housing and the position detector detects that the touch operation is being applied to the display surface.

16. The display device according to claim 15, wherein the controller selects the first operation from the plurality of possible different operations both as a function of the amount, greater than zero, that the pressing force is above the threshold value and the number of pressing operations, greater than one, that are applied to the housing.

17. The display device according to claim 15, wherein the controller selects the first selected operation from the plurality of possible different operations as a function of the number of consecutive pressing operations, greater than one, applied to the same location on the housing during a predetermined time period.

18. The display device according to claim 17, wherein the predetermined time period is two seconds.

19. The display device according to claim 15, wherein the controller selects the first selected operation as a function of (a) the pressing force, (b) the pressing time and (c) the number of consecutive pressing operations applied to the same location on the housing.

20. A non-transitory computer readable media having stored thereon a computer program which, when run on one or more processors associated with a display device having display which has a display surface, a housing which includes an opening portion though which the display surface is exposed, a position detector which detects a touch operation applied to the display surface and a pressing operation detector which detects a pressing operation applied to the housing, the pressing operation being a pressing force applied to the housing that is greater than a threshold value, will cause the one or more processors to:
carry out a first selected operation of a plurality of different possible operations when the pressing operation detector detects that the pressing operation is being applied to the housing and the position detector detects that the touch operation is not being applied to the display surface, the one or more processors selecting one of the plurality of possible different operations when n consecutive pressing operations, n being an integer greater than 1, are applied to the same location on the housing, and selecting a different one of the plurality of possible different operations when m consecutive pressing operations, m being an integer greater than n, are applied to the same location on the housing; and
carries out a second selected operation when the pressing operation detector detects that the pressing operation is being applied to the housing and the position detector detects that the touch operation is being applied to the display surface.

21. The non-transitory computer readable media according to claim 20, wherein the first selected operation is selected from the plurality of possible operations both as a function of the amount, greater than zero, that the pressing force is above the threshold value and the number of pressing operations, greater than one, that are applied to the same location on the housing.

22. The non-transitory computer readable media according to claim 20, wherein the controller selects the first selected operation from the plurality of possible different operations as a function of the number of consecutive pressing operations, greater than one, applied to the same location on the housing during a predetermined time period.

23. The non-transitory computer readable media according to claim 22, wherein the predetermined time period is two seconds.

24. The non-transitory computer readable media according to claim 20, wherein the controller selects the first selected operation as a function of (a) the pressing force, (b) the pressing time and (c) the number of consecutive pressing operations applied to the same location on the housing.

* * * * *